US010887450B1

(12) United States Patent
Wilson (10) Patent No.: US 10,887,450 B1
(45) Date of Patent: Jan. 5, 2021

(54) SYSTEMS AND METHODS FOR LOCATING FAULTS IN A TELECOMMUNICATION LINE USING LINE TEST DATA

(71) Applicant: ADTRAN, INC., Huntsville, AL (US)

(72) Inventor: Arlynn Wayne Wilson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 16/123,906

(22) Filed: Sep. 6, 2018

(51) Int. Cl.
*H04M 3/08* (2006.01)
*H04M 3/36* (2006.01)
*H04M 3/30* (2006.01)

(52) U.S. Cl.
CPC ............ *H04M 3/085* (2013.01); *H04M 3/30* (2013.01); *H04M 3/36* (2013.01)

(58) Field of Classification Search
CPC ........... H04M 3/085; H04M 3/30; H04M 3/36
See application file for complete search history.

(56) References Cited

U.S. PATENT DOCUMENTS

| | | | | |
|---|---|---|---|---|
| 5,500,879 A * | 3/1996 | Webster | ................... | H04B 3/23 375/257 |
| 6,334,219 B1 * | 12/2001 | Hill | ........................... | H04L 1/24 725/106 |
| 6,538,451 B1 * | 3/2003 | Galli | ....................... | H04B 3/54 324/533 |
| 6,628,754 B1 * | 9/2003 | Murphy | ................... | H04B 3/46 370/252 |
| 6,721,394 B1 * | 4/2004 | Murphy | .............. | H04L 27/2602 375/222 |
| 6,744,813 B1 * | 6/2004 | Ko | ........................... | H04B 3/46 375/224 |
| 6,870,901 B1 * | 3/2005 | Gudmundsson | ......... | H04B 3/32 370/242 |
| 7,177,350 B1 * | 2/2007 | Long | ................... | H04L 27/2614 375/222 |
| 7,558,315 B2 * | 7/2009 | Cioffi | .................. | H04L 12/2874 375/222 |
| 7,835,431 B2 * | 11/2010 | Belge | ...................... | H04L 1/245 375/222 |
| 8,199,905 B1 * | 6/2012 | Barrett | .................. | H04M 1/738 379/387.01 |

(Continued)

OTHER PUBLICATIONS

Arlynn Wayne Wilson, U.S. Appl. No. 16/232,904, entitled, "Systems and Methods for Detecting Faults in a Telecommunication System Using Retrain Data," filed Dec. 26, 2018.

*Primary Examiner* — James M Perez
(74) *Attorney, Agent, or Firm* — Maynard Cooper & Gale, P. C.; Jon E. Holland (57) ABSTRACT

A fault in a telecommunication line can be identified and located using line test data for that telecommunication line. A series of line tests can be performed on a selected telecommunication line experiencing problems. The results from the series of line tests can be analyzed to identify differences in the results between the line tests. The identified differences can then be used to determine if a fluctuation is present in the telecommunication line. If a fluctuation is determined to be present in the telecommunication line, the identified differences can also be used to determine a location of the fluctuation relative to reference location such as the distribution point where the telecommunication line originates.

29 Claims, 6 Drawing Sheets

(56) References Cited

U.S. PATENT DOCUMENTS

| | | | | |
|---|---|---|---|---|
| 8,208,604 B1* | 6/2012 | Chu | | H04M 3/26 |
| | | | | 379/22.03 |
| 8,509,421 B2* | 8/2013 | Dollinger | | H04M 3/30 |
| | | | | 379/399.01 |
| 8,855,177 B1* | 10/2014 | Wilson | | H04B 3/32 |
| | | | | 375/222 |
| 9,124,723 B2* | 9/2015 | Kuipers | | H04M 11/062 |
| 9,191,496 B1* | 11/2015 | Barrett | | H04M 3/2209 |
| 9,380,152 B2* | 6/2016 | Joffe | | H04M 19/001 |
| 10,530,527 B1* | 1/2020 | Wilson | | H04L 1/006 |
| 2002/0110221 A1* | 8/2002 | Norrell | | H04M 3/303 |
| | | | | 379/22.03 |
| 2003/0112967 A1* | 6/2003 | Hausman | | H04B 3/23 |
| | | | | 379/417 |
| 2003/0198217 A1* | 10/2003 | Redfern | | H04L 5/143 |
| | | | | 370/352 |
| 2003/0223484 A1* | 12/2003 | Suzuki | | H04L 27/2662 |
| | | | | 375/222 |
| 2003/0223485 A1* | 12/2003 | Noma | | H04L 27/2662 |
| | | | | 375/222 |
| 2005/0123030 A1* | 6/2005 | Belge | | H04L 5/1438 |
| | | | | 375/222 |
| 2006/0098725 A1* | 5/2006 | Rhee | | H04B 3/48 |
| | | | | 375/222 |
| 2006/0193444 A1* | 8/2006 | Aufenast | | H04M 3/247 |
| | | | | 379/22 |
| 2006/0251160 A1* | 11/2006 | Fazlollahi | | H04L 27/2601 |
| | | | | 375/222 |
| 2009/0210554 A1* | 8/2009 | Schmitt | | H04M 3/30 |
| | | | | 709/237 |
| 2012/0224674 A1* | 9/2012 | Goodson | | H04M 3/34 |
| | | | | 379/27.01 |
| 2012/0250492 A1* | 10/2012 | Schneider | | H04Q 11/04 |
| | | | | 370/201 |
| 2013/0022178 A1* | 1/2013 | Rhee | | H04L 41/5035 |
| | | | | 379/32.04 |
| 2015/0030138 A1* | 1/2015 | Kalavai | | H04M 3/30 |
| | | | | 379/1.03 |
| 2015/0085996 A1* | 3/2015 | Mohseni | | H04M 3/306 |
| | | | | 379/22.04 |
| 2015/0163349 A1* | 6/2015 | Ardestani | | H04M 3/306 |
| | | | | 379/22.02 |
| 2015/0180596 A1* | 6/2015 | Berg | | H04B 17/30 |
| | | | | 375/224 |
| 2016/0028866 A1* | 1/2016 | Ahmadi | | H04M 1/24 |
| | | | | 379/28 |
| 2016/0191118 A1* | 6/2016 | Kalavai | | H04M 3/301 |
| | | | | 379/1.03 |
| 2016/0337512 A1* | 11/2016 | Kalavai | | H04M 3/306 |
| 2017/0180549 A1* | 6/2017 | Zahedi | | H04B 3/46 |
| 2018/0027113 A1* | 1/2018 | Mohseni | | H04M 3/085 |
| | | | | 379/22.04 |

* cited by examiner

SYSTEMS AND METHODS FOR LOCATING FAULTS IN A TELECOMMUNICATION LINE USING LINE TEST DATA

BACKGROUND

A network service provider can provide telephone service and/or high speed data service to its customers using a DSL (digital subscriber line) system. A DSL system can use existing metallic (e.g., copper) drop wires (referred to as drop connections) that extend from a distribution point to the customer premises to provide the telephone service and/or high speed data service to the customer. If there are anomalies or defects (e.g., a bad splice or a "high open" condition) associated with the drop connection, the customer may experience problems (e.g., intermittent echoes) with his or her service.

Due to the intermittent nature of some of the anomalies or defects, the identification of the source of the anomaly or defect can be difficult for maintenance personnel. Some DSL systems may implement echo cancellation techniques that can be used to locate the source of the anomaly or defect in a drop connection. However, not all DSL systems can use echo cancellation techniques to identify the source of the anomalies or defects in a drop connection because not all of the DSL protocols that may be used by the DSL systems require the use of echo cancellation. Further, even if the DSL system does include echo cancellation techniques, the echo cancellation techniques may not be available for use by maintenance personnel to identify the source of an anomaly or defect in a drop connection because the echo cancellation techniques may be encapsulated within third party hardware components and be inaccessible to maintenance personnel.

Alternatively, a maintenance person can attempt to identify the source of anomaly or defect in a drop connection by travelling to the distribution point and using test equipment to identify the source of the anomaly or defect in the drop connection. However, sending a maintenance person to the distribution point in order to identify the source of an anomaly or defect can be expensive and time consuming.

BRIEF DESCRIPTION OF THE DRAWINGS

Wherever possible, the same reference numbers are used throughout the drawings to refer to the same or like parts.

DETAILED DESCRIPTION

The present application generally pertains to identifying and locating faults in a telecommunication line used to communicate signals or messages in accordance with a discrete multi-tone (DMT) modulation scheme. The DMT modulation scheme may be associated with a DSL (digital subscriber line) protocol used for communication over the telecommunication line. A telecommunication line can be suspected of having a fault condition present if the corresponding port for the telecommunication line at an intermediate point located between the central office and the customer premises has to go through a retraining sequence or process a predetermined number of times within a predetermined time period (e.g., 24 hours). Alternatively, a telecommunication line can be suspected of a having a fault condition if the service provider receives a complaint from a customer regarding the customer's service that is provided over the telecommunication line. Once a telecommunication line is identified as having a possible fault condition, a plurality of line tests can be performed on the telecommunication line. The plurality of line tests can be performed within a maintenance window for the telecommunication line, prior to performing a retraining sequence on the telecommunication line, within the window for the retraining sequence associated with the telecommunication line, or during a self-generated window resulting from the halting of communications over the telecommunication line. The plurality of line tests can be a single ended line test (SELT) that can be incorporated within the DSL protocol being used to implement the DMT modulation scheme. In an embodiment, the SELT can include sending a test signal for each tone used by the DMT modulation scheme.

The results received from the SELT can be in the frequency domain and can correspond to an impedance for the telecommunication line. An inverse fast Fourier transform can be applied to the received results to convert the results from the frequency domain to the time domain. The transformed results, which can include values at several different times, can then be compared to the values of other transformed results from other line tests to determine the differences (if any) between the corresponding values of the transformed results being compared. The comparison of the transformed results can involve a comparison of actual values, magnitudes or derivative values of the transformed results. Alternatively, the received results may be compared in the frequency domain prior to transforming the results.

Once the differences between the values of the results have been determined, the differences can be analyzed to determine if there is a fluctuation in one or more of the differences. The determination of a fluctuation in one or more of the differences can confirm the presence of a fault in the telecommunication line. A fluctuation in the differences can be determined from a specific difference value or the sum of several corresponding specific difference values exceeding a predetermined threshold value. A fault in the telecommunication line can cause intermittent changes in impedance, which can cause variations in the transformed results. Such variations can result in the generation of corresponding difference values that can be large enough to be considered fluctuations. After a fluctuation is identified, the location of the fluctuation can be determined from the corresponding difference values since the transformed results, which are in the time domain, used to generate the differences can correspond to a distance from the intermediate point originating the telecommunication line.

The present application also pertains to a method for identifying and locating intermittent high open, bad splice behavior which can cause chronic port retrains in ADSL, VDSL and vectored VDSL equipped hardware (e.g., a DSLAM (DSL Access Multiplexer)). The method first identifies a troubled port by determining if a port has been retrained more than a predetermined number of times within a certain time period (e.g., 24 hours). Alternatively, a customer can call with a complaint that is used to identify the troubled port. Next, for the troubled port, a periodic SELT (single ended line test) can be forced on the troubled port or the SELT can be executed multiple times following a retrain event. The FDR (frequency domain reflectometry) result from the SELT test can be processed using an IFFT (inverse fast Fourier transform) to create a TDR (time domain reflectometry) type response for each SELT FDR capture. The differences between the series of SELT FDR captures, either from the FDR results or the processed TDR results, are computed. Using the differences, which may be actual values, magnitudes, or their first and/or second derivatives, with some corresponding thresholds, changes in the differences can be detected to see fluctuations on the line. The distance from the DSLAM to the line fluctuation can be located and an alarm or message indicating the fluctuation's existence and location can be provided.

Figure 1:
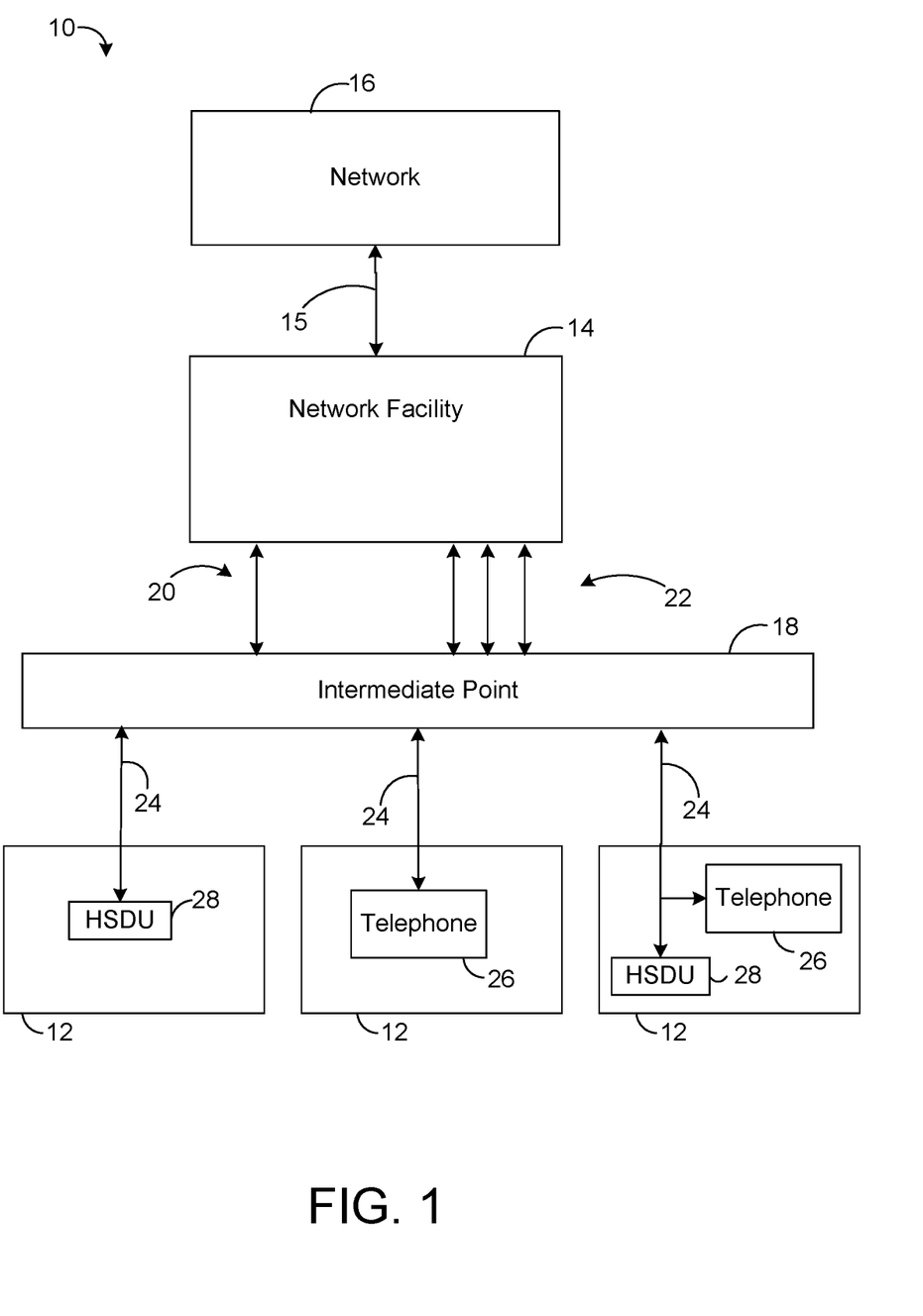
FIG. 1 is a block diagram showing an embodiment of a telecommunication system.

FIG. 1 shows a system 10 for communicating data and voice between several customer premises 12 and at least one network 16. The network 16 can include any of various types of telecommunication networks, such as the public switched telephone network (PSTN), local area networks (LANs), wide area networks (WANs), cellular networks, the Internet, or other types of networks known to carry telecommunication signals. The at least one network 16 can be connected to a network facility 14, such as a central office, by one or more connections 15. The network facility 14 can be connected to an intermediate point 18 by at least one high-speed data connection 20 (e.g., an optical fiber) and POTS (plain old telephone service) lines 22. In one embodiment, the intermediate point 18 can correspond to a distribution point (DP). However, in other embodiments, the intermediate point 18 can correspond to any point located between the network facility 14 and the customer premises 12 having a suitable hardware configuration to facilitate communication between the customer premises 12 and the network facility 14.

The high-speed data connection 20 provides a high-speed channel that carries a data stream between the intermediate point 18 and the network facility 14. While the embodiment in FIG. 1 shows one intermediate point 18 connected to the network facility 14 and three customer premises 12 connected to the intermediate point 18, more than one intermediate point 18 can be connected to the network facility 14 and more or less than three customer premises 12 can be connected to an intermediate point 18. In addition, there may be more than one intermediate point 18 connected between the network facility 14 and a customer premises 12.

As shown by FIG. 1, the intermediate point 18 is connected or coupled to customer premises equipment (CPE) at one or more customer premises 12 via at least one conductive connection 24, such as a twisted-wire pair. The physical or conductive connection 24 from the intermediate point 18 to customer premises 12 is typically referred to as a "drop connection" or "subscriber line." Each drop connection 24 can be connected to one or more CPE components, such as a telephone 26, a high-speed data unit (HSDU) 28, a fax machine (not shown), etc., located at the customer premises 12. The HSDU 28 can include a modem or any other type of device that can send and receive high-speed data over the drop connection 24.

Figure 2:
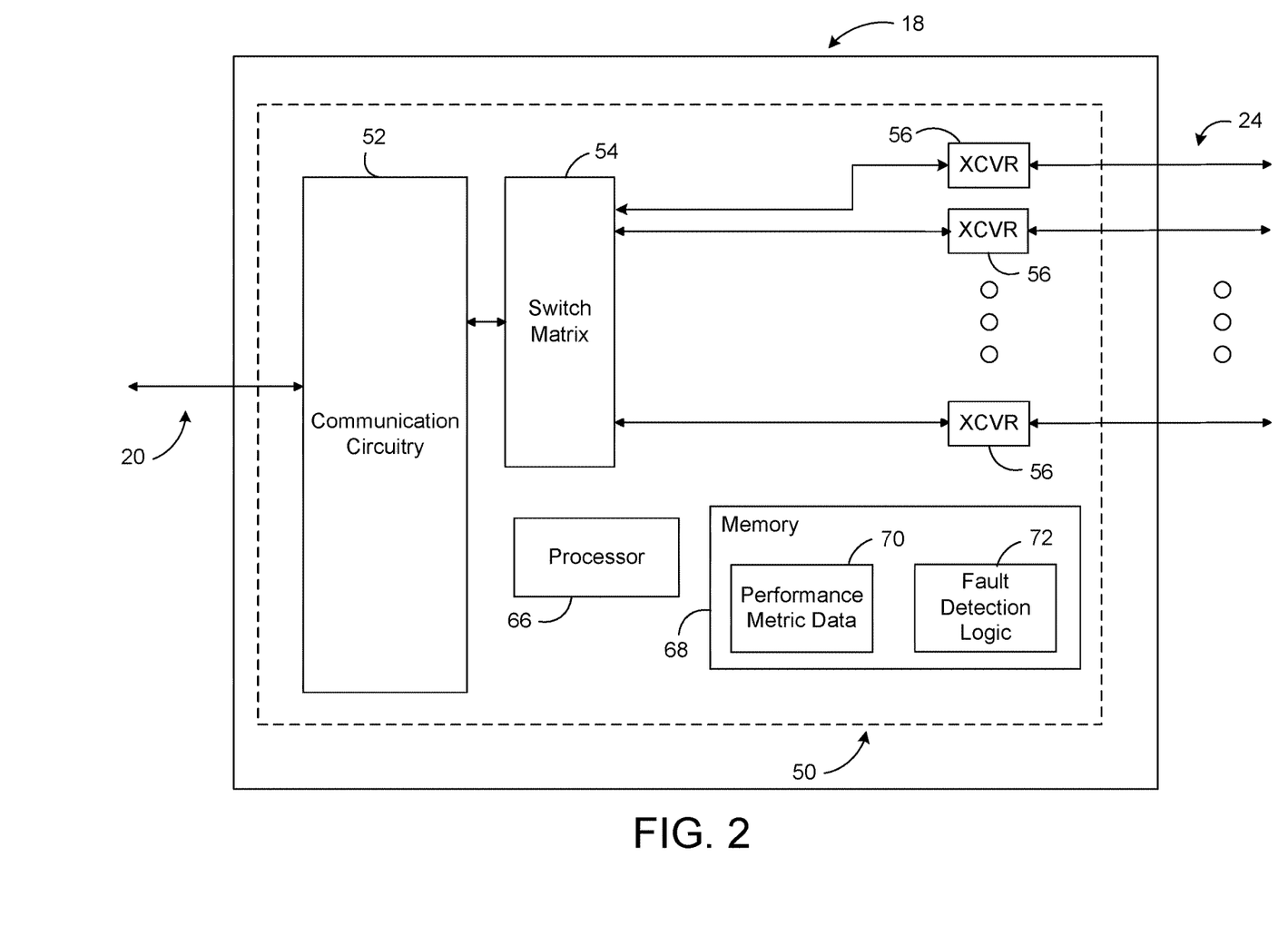
FIG. 2 is a block diagram showing an embodiment of an intermediate point from the telecommunication system of FIG. 1.

FIG. 2 shows an embodiment of the intermediate point 18 that has equipment for providing voice and/or high-speed data to customer premises 12. The intermediate point 18 can include one or more service units 50 having communication circuitry 52 coupled to the high-speed data connection 20. The communication circuitry 52 can process the signal received from the data connection 20 and may include a classifier (not specifically shown) for classifying traffic received from the data connection 20, as is known in the art.

The service unit 50 can process data packets in both the downstream and upstream directions. In the downstream direction, the service unit 50 receives, from the communication circuitry 52, at least a portion of the data packets provided to the intermediate point 18 by the network 16 via high-speed data connection 20. The service unit 50 can then de-multiplex the data for transmission across a plurality of subscriber lines or drop connections 24. In the upstream direction, the service unit 50 receives a plurality of data packets from a plurality of subscriber lines or drop connections 24 and multiplexes the data into a high-speed data signal that can be provided to communication circuitry 52 for transmission upstream to the network 16. In one embodiment, the service unit 50 can be a DSL Access Multiplexer (DSLAM).

The communication circuitry 52 can be used to process upstream and downstream packet flows for the high-speed data service (HSDS). The communication circuitry 52 can include an optical network units (ONU) (not specifically shown) that can receive at least one packet flow from the high-speed data connection 20 and convert the received packet flow(s) from the optical domain to the electrical domain. At least a portion of the converted packet flow(s) can then be forwarded to a switch matrix 54 of the service unit 50 and then sent to the customer premises 12 using a plurality of transceivers 56. The transceivers 56 can communicate using DSL (digital subscriber line) protocols such as asymmetric DSL (ADSL), very-high-bit-rate DSL (VDSL), G.fast, or vectored VDSL. However, in other embodiments, other DSL protocols such as high-bit-rate DSL (HDSL) and VDSL2 or other known protocols can also be used.

The switch matrix 54 can be configured to forward the data packets of the high-speed data stream from the communication circuitry 52 to the transceivers 56 based on the destination addresses in the data packets such that each data packet is ultimately received by the CPE (e.g., the HSDU 28) identified by the packet's destination address. In one embodiment, the switch matrix 54 can be a field programmable gate array (FPGA), but other type of control or switching devices can be used for the switch matrix 54 in other embodiments. In one embodiment, the data packets can be communicated across the drop connections 24 using discrete multi-tone (DMT) modulation in accordance with the corresponding DSL protocol being used. DMT modulation uses a sequence of equally spaced frequencies or tones, each of which is modulated using quadrature amplitude modulation (QAM), to encode multiple carrier signals at different frequencies with digital data. However, other modulation formats may be used in other embodiments.

The service unit 50 can include logic 72, referred to herein as "fault detection logic," for detecting faults between the intermediate point 18 and the customer premises 12. The fault detection logic 72 can perform line tests and identify the location of a detected fault based on information stored in performance metric data 70. The fault detection logic 72 can be implemented in software, hardware, firmware or any combination thereof. In the service unit 50 shown in FIG. 2, the fault detection logic 72 is implemented in software and stored in memory 68 of the service unit 50. Note that the fault detection logic 72, when implemented in software, can be stored and transported on any non-transitory computer-readable medium for use by or in connection with an instruction execution apparatus that can fetch and execute instructions. In the context of this document, a "computer-readable medium" can be any means that can contain or store a program for use by or in connection with an instruction execution apparatus.

The service unit 50 can include at least one conventional processor 66, which has processing hardware for executing instructions stored in memory 68. As an example, the processor 66 may include a central processing unit (CPU), a digital signal processor (DSP), a microprocessor or a network processor. The processor 66 can communicate with and drive other elements within the service unit 50 via a local interface (not shown), which can include at least one bus.

Figure 3:
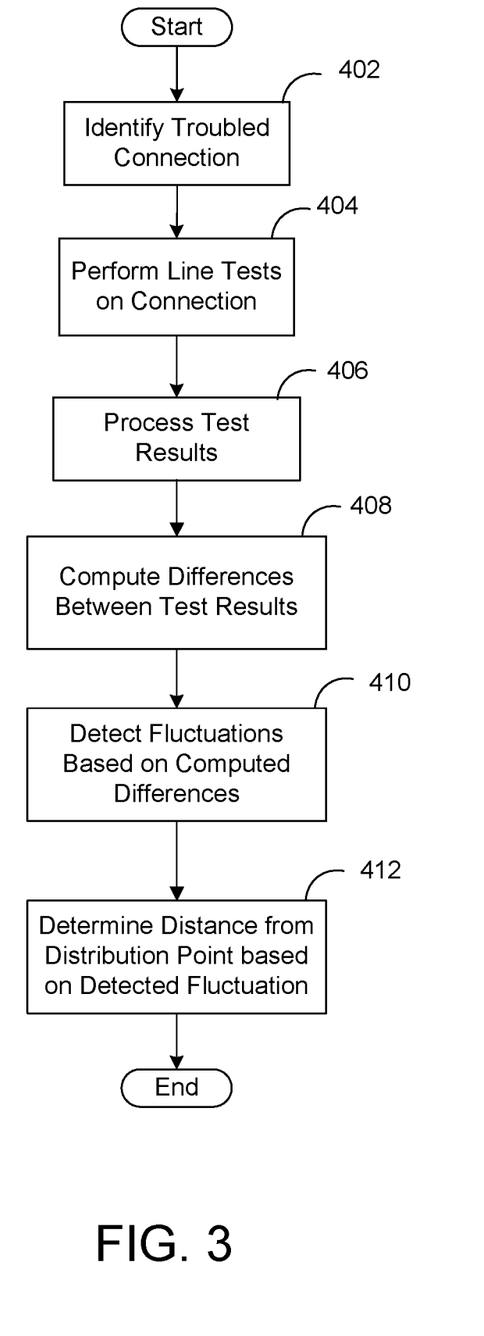
FIG. 3 is a flowchart showing an embodiment of a process for detecting faults using line test data.

FIG. 3 is a flowchart showing an embodiment of a process for detecting faults using line test data. The process begins with the identification of a "troubled" drop connection (step 402). A troubled drop connection can be a drop connection 24 that is experiencing one or more problems (e.g., echoes) as a result of one or more defects or anomalies, such as a bad splice, associated with the drop connection 24. In one embodiment, the troubled drop connection 24 can be automatically identified based on whether a particular port associated with a drop connection 24 of the service unit 50 has been retrained a predetermined number of times within a predetermined time period (e.g., 24 hours). In another embodiment, the troubled drop connection can be identified based on customer complaints regarding the customer's service provided by the drop connection 24. In other embodiments, other techniques for identifying a troubled drop connection.

Figure 6:
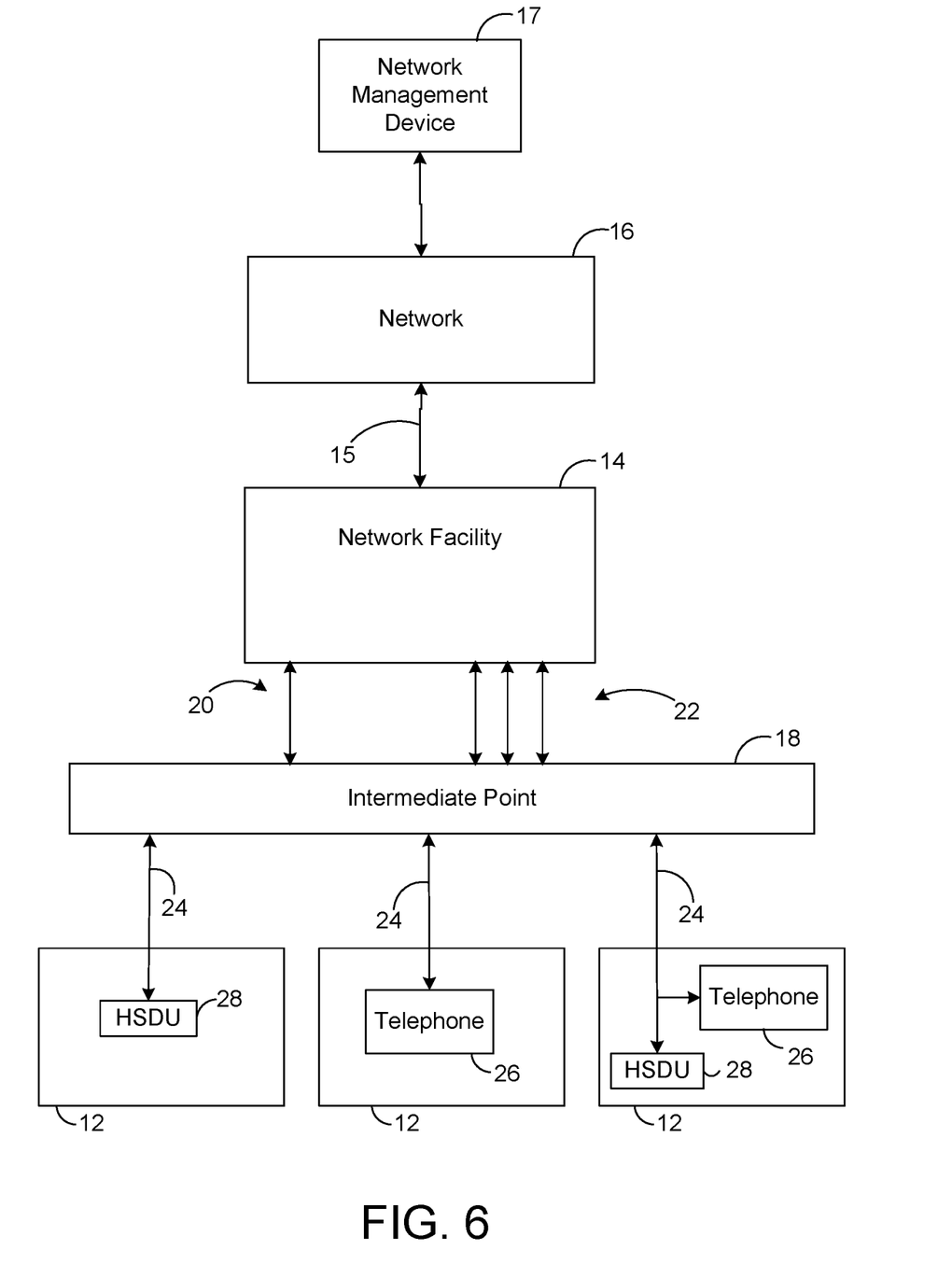
FIG. 6 is a block diagram showing another embodiment of a telecommunication system.

The troubled drop connection 24 can be automatically identified based on retrain information for each port (or drop connection) of the service unit 50 stored in performance metric data 70. The performance metric data 70 can store performance metrics, such as the number of retrains, for each transceiver 56. Each time a transceiver 56 is retrained (or reinitialized) as a result of an error, signal margin fluctuation, or other similar triggering event, the performance metric data 70 associated with that transceiver can be updated to indicate that the transceiver 56 has been retrained. The information regarding the number of retrains for a transceiver 56 (or port) in the performance metric data 70 can be accessed by the processor 66 of the service unit 50 to determine if the transceiver 56 (or port) has been retrained the predetermined number of times within the predetermined time period. In another embodiment, a network management device or management entity that is connected to the intermediate point 18 can retrieve the performance metric data 70 from the service unit 50 and analyze the data to determine if a transceiver 56 (or port) has been retrained the predetermined number of times within the predetermined time period. If the network management device determines that a transceiver 56 (or port) has been retrained the predetermined number of times within the predetermined time period, the network management device can notify the corresponding service unit 50 of the troubled drop connection at the service unit 50. In one embodiment, the network management device can be a management element at the network facility 14. In another embodiment, as shown in FIG. 6, the network management device 17 can be coupled to the network 16 and communicate with the network facility 14 (and intermediate point 18) via network 16.

In one embodiment, the performance metric data 70 may also store other information on the transceivers 56 in addition to the number of times the transceiver has been retrained. For example, the performance metric data 70 can include information on the number of bits sent and received by the transceiver 56, the number of seconds the transceiver 56 was unavailable, the number of erred seconds for the transceiver 56 and the number of severely erred seconds for the transceiver 56. The information can be obtained from the transceivers 56 at a predetermined time interval (e.g., every 15 minutes) and stored in performance metric data 70.

Once the troubled drop connection is identified, a plurality of line tests are performed on the troubled drop connection (step 404) by the fault detection logic 72. Each line test may be performed during a maintenance window for the troubled drop connection. Alternatively, communications using the troubled drop connection may be halted in order to perform the line test. A further option for performing the line test is to perform the line test between the time when a fault is detected for a transceiver and the retraining of the transceiver occurs (e.g., prior to starting the retraining of the transceiver). In one embodiment, the plurality of line tests can be periodically performed on the troubled drop connection at a predefined interval (e.g., every 15 minutes). However, in other embodiments, different intervals can be used between two lines tests and the interval can vary between 5 minutes and 30 minutes.

In one embodiment, a single ended line test (SELT) can be performed a predetermined number of times (e.g., 5 times) on the troubled drop connection when performing the plurality of line tests. The SELT can be incorporated within the corresponding DSL protocol (e.g., VDSL or ADSL) and can provide a frequency domain measurement of input impedance. For example, when using DMT modulation, the SELT can send a test signal for each tone used by the DMT modulation and receive a corresponding reflection (or echo) for each tone. In one embodiment, the test signal can be a sinusoid having a fixed amplitude and phase and the received signal (the reflection) can have its own amplitude and phase which are shifted from the amplitude and phase of the test signal. In one embodiment, the results of the SELT for each tone in the DMT modulation can be a complex number that corresponds to the phase and gain shift of the transmitted signal. However, other types of line tests (e.g., a dual ended line test (DELT) or a TScan) can be performed on the troubled drop connection in addition to or in place of the SELT in other embodiments.

The results from the plurality of line tests are then individually processed by the fault detection logic 72 (step 406), which may include processing the responses for each tone when DMT modulation is used. In one embodiment, the processing of each of the line test results can include converting line test results that are in the frequency domain (e.g., a frequency domain reflectometry (FDR) response) to results that are in the time domain (e.g., a time domain reflectometry (TDR) response) using an inverse fast Fourier transform (IFFT). For example, the IFFT can be provided a set of complex numbers from a SELT on a DMT modulated drop connection to get a response in the time domain. In one embodiment, the TDR response can indicate reflections on the line with respect to distance, which is based on the elapsed time between when a test signal is sent and when the reflection is received.

Figure 4:
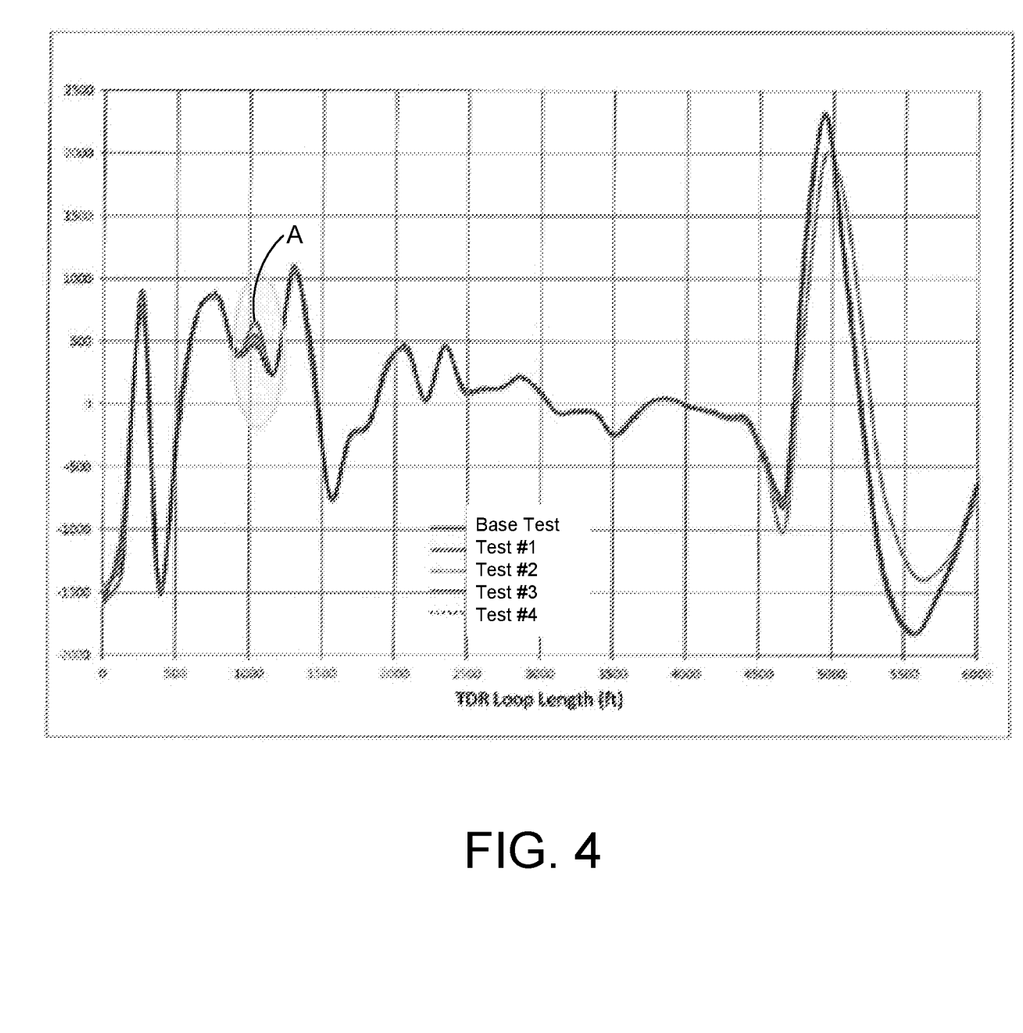
FIG. 4 is an exemplary embodiment of a graph showing line test results with respect to distance.

The differences between the individual test results are then computed by the fault detection logic 72 (step 408). The differences between the individual test results can be determined by comparing a value at a specific instance in time (corresponding to a distance) from a base test result (e.g., the first test result from the plurality of line tests) to a corresponding value at the same specific instance in time (corresponding to a distance) from each of the other test results (e.g., the subsequent test results from the plurality of line tests). FIG. 4 shows an exemplary embodiment of a graph with results for a base test and 4 subsequent tests with respect to distance. In FIG. 4 (and in FIG. 5), the distance parameters provided along the horizontal axis correspond directly to time measurements since the distance parameter can be calculated based on the elapsed time between the sending of the signal and the receiving of its reflection.

As an example, a point on a curve for one of the curves may represent a measurement (e.g., amplitude) of a reflection of a signal received at the transceiver at a certain time after transmission of the signal from the transceiver. Such measurement corresponds to a distance along the subscriber line to the point at which the reflection was reflected back toward the transceiver since it takes a certain finite time for the signal to travel to the reflection point and reflect from such point back to the transceiver. Thus, points on the curves for all of the tests at the same horizontal coordinate of the graph of FIG. 4 represent measurements for the same reflection point along the subscriber line (which is at a certain distance indicated by the horizontal axis). Significant differences between test results for that point may indicate that an anomaly exists there (e.g., the impedance fluctuates over time). In one embodiment, the differences between the line test results can be determined with the TDR results (as shown in FIG. 4), but the differences may also be determined with the FDR results in other embodiments. In some embodiments, a difference between line test results for a corresponding distance (represented by an x-coordinate on the graph of FIG. 4) may be calculated by subtracting a value of one test for the corresponding distance and a value for another test for the corresponding distance. Moreover, a difference for each respective test result pair may be calculated for the corresponding distance, and the differences for the same distance may be summed or otherwise combined in order to determine a value indicative of an amount of fluctuation in impedance that is detected to occur at the corresponding distance over time, as will be described in more detail below.

Figure 5:
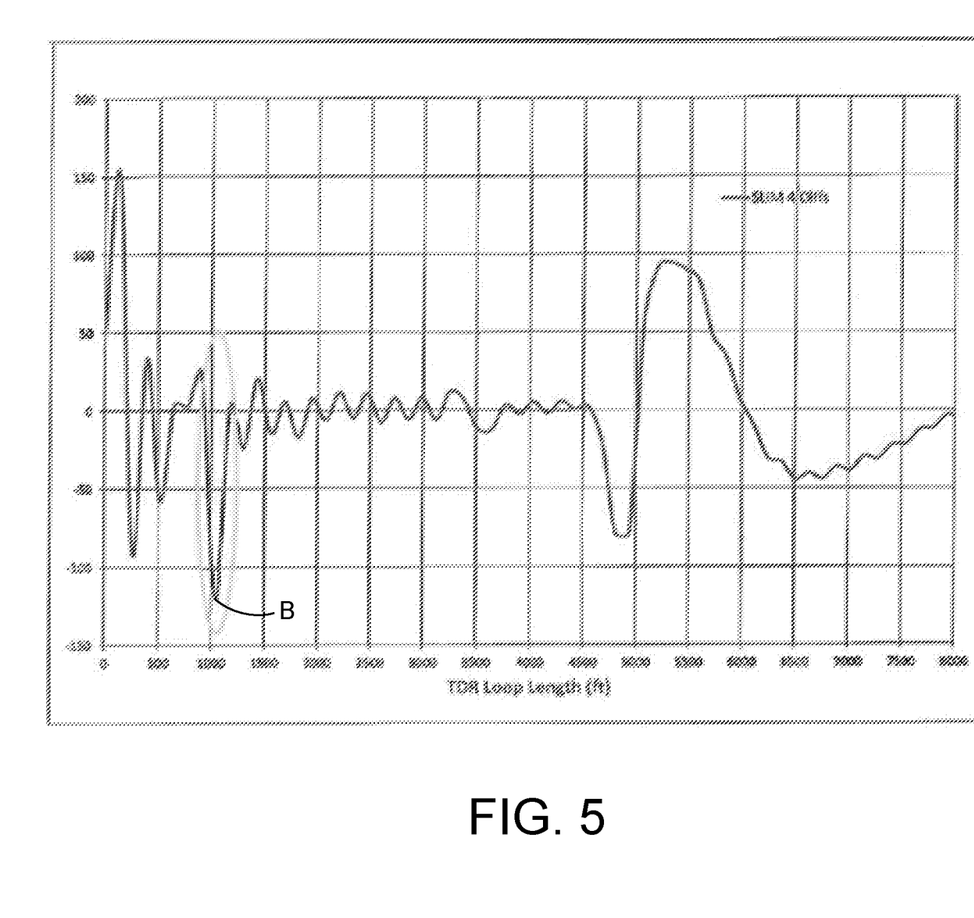
FIG. 5 is an exemplary embodiment of a graph showing the sum of the differences from the line test results of the graph of FIG. 4 with respect to distance.

In this regard, referring to FIG. 3, after the differences between the line test results have been determined, fluctuations in the results can be determined based on the computed differences (step 410). The fluctuations between individual test results can be used to identify changes in impedance (or the reflections) over time. Fluctuations in the results can be determined using the actual values of the differences, the magnitudes of the differences, or the first or second derivatives of the differences. Fluctuations in the results can be identified by the presence of differences between line test results greater than a predetermined threshold. In one embodiment, a fluctuation can be determined by summing the differences calculated from the individual line tests at each specific instance of time (corresponding to a distance) and comparing the total of the differences to a predetermined threshold amount. If the magnitude of the total of the differences is greater than the predetermined threshold amount, a fluctuation can be determined to be present. In other embodiments, other techniques or calculations can be used to determine the presence of a fluctuation at a specific instance of time (corresponding to a distance). Fluctuations and differences in the line test results can occur as a result of the presence of anomalies or defects in the drop connection, which can result in an intermittent change in the impedance of the drop connection. Areas of the drop connection that do not have an anomaly or defect can generally provide the same results at each specific instance of time (or distance) for each line test and thus, would not result in the occurrence of a fluctuation or difference between the line test results since there would be no difference or an insignificant difference between the corresponding line tests. In other words, the results of each line test do not significantly change at each specific instance of time (or distance) if there is no anomaly or defect present at the corresponding location in the drop connection. FIG. 5 shows an exemplary embodiment of a graph with the sum of the differences from the TDR test results shown in FIG. 4.

The distance from a reference location to the defect(s) in the drop connection 24 can then be determined based on the detected fluctuation(s) (step 412). In one embodiment, the reference location can be the intermediate point 18, but the reference location can correspond to other physical locations in other embodiments. An alarm and/or message can then be provided to a user to inform the user of the defect and the probable location of the defect relative to the intermediate point 18. For example, Point A of FIG. 4 shows corresponding deviations between the TDR test results at a particular distance (or time). The sum of the differences from each specific instance of distance (or time) in the difference results in FIG. 4 results in a large difference total shown by Point B of FIG. 5, which is located at approximately the same distance as Point A in FIG. 4. The large difference total shown by Point B of FIG. 5 can correspond to an identifiable fluctuation and can be used to determine the distance from the distribution point to the anomaly or defect in the drop connection. In the example shown in FIGS. 4 and 5, an anomaly or defect is indicated at just over 1000 feet from the intermediate point 18.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A service unit for a telecommunication system comprising:
   a transceiver coupled by a telecommunication line to a customer premises (CP) unit located at a customer premises, wherein the transceiver is configured to communicate with the CP unit through the telecommunication line using discrete multi-tone (DMT) modulation;
   a processor coupled to the transceiver; and
   memory coupled to the processor, the memory storing a plurality of instructions that, when executed by the processor, cause the processor to:
     perform a plurality of line tests on the telecommunication line;

receive a plurality of results from the plurality of line tests;

compare the plurality of results to compute a plurality of difference values, each of the plurality of difference values corresponding to a location along the telecommunication line and indicating a difference in amplitudes of signals reflected from the location;

analyze the plurality of difference values to determine at least one fluctuation on the telecommunication line at the location; and detect a fault condition at the location based on the at least one fluctuation.

2. The service unit of claim 1, wherein each line test of the plurality of line tests incorporates a test signal for each tone used by the DMT modulation.

3. The service unit of claim 1, wherein the plurality of instructions cause the processor to convert the plurality of results from the frequency domain to the time domain prior to comparing the plurality of results.

4. The service unit of claim 1, wherein the plurality of instructions cause the processor to provide the location of the fault condition as a distance from the transceiver.

5. The service unit of claim 1, wherein the plurality of instructions cause the processor to provide an alarm or message to a user indicating the presence and location of the fault condition on the telecommunication line.

6. The service unit of claim 1, wherein the plurality of line tests include at least one of a single ended line test or dual ended line test.

7. The service unit of claim 1, wherein the plurality of instructions cause the processor to determine a total value by adding the plurality of difference values corresponding to the location along the telecommunication line and compare the total value to a threshold value to determine the presence of a fluctuation at the location.

8. A service unit for a telecommunication system comprising:
a transceiver coupled by a telecommunication line to a customer premises (CP) unit located at a customer premises, wherein the transceiver is configured to communicate with the CP unit through the telecommunication line using discrete multi-tone (DMT) modulation;
a processor coupled to the transceiver; and
memory coupled to the processor, the memory storing performance metric data associated with the transceiver and a plurality of instructions that, when executed by the processor, cause the processor to:
review the performance metric data associated with the transceiver stored in memory to determine when to perform a plurality of line tests;
perform the plurality of line tests on the telecommunication line;
receive corresponding results from each line test of the plurality of line tests;
compare the received results of the plurality of line tests to compute a plurality of difference values; and
analyze the plurality of difference values to determine at least one fluctuation on the telecommunication line and the location of the at least one fluctuation on the telecommunication line, wherein the location of the at least one fluctuation corresponds to a fault condition in the telecommunication line.

9. A service unit for a telecommunication system comprising:
a transceiver coupled by a telecommunication line to a customer premises (CP) unit located at a customer premises, wherein the transceiver is configured to communicate with the CP unit through the telecommunication line using discrete multi-tone (DMT) modulation;
a processor coupled to the transceiver; and
memory coupled to the processor, the memory storing a plurality of instructions that, when executed by the processor, cause the processor to:
perform a plurality of line tests on the telecommunication line;
receive corresponding results from each line test of the plurality of line tests;
compare the received results of the plurality of line tests to compute a plurality of difference values;
analyze the plurality of difference values to determine at least one fluctuation on the telecommunication line and the location of the at least one fluctuation on the telecommunication line, wherein the location of the at least one fluctuation corresponds to a fault condition in the telecommunication line; and
compare a sum of corresponding difference values of the plurality of difference values to a threshold value to determine the presence of a fluctuation.

10. A method of locating faults in drop connections of a telecommunication system, the method comprising:
selecting a drop connection, wherein the selected drop connection has a corresponding transceiver that uses discrete multi-tone (DMT) modulation for communication via the drop connection;
performing at least two line tests on the selected drop connection;
receiving a plurality of results from the at least two line tests;
comparing the plurality of results to compute two or more differences, each of the two or more differences corresponding to a location along the drop connection and indicating a difference in amplitudes of signals reflected from the location;
analyzing the two or more differences to determine at least one fluctuation on the selected drop connection at the location; and
detecting a fault at the location based on the determined at least one fluctuation.

11. The method of claim 10, wherein the plurality of results from the at least two line tests are in the frequency domain and the method further comprises processing the plurality of results from the at least two line tests to convert the plurality of results from the frequency domain to the time domain.

12. The method of claim 11, wherein the processing the plurality of results includes performing an inverse fast Fourier transform on the plurality of results from the at least two line tests.

13. The method of claim 10, wherein the detecting the fault includes determining a distance from a reference location to the fault.

14. The method of claim 10, wherein the performing at least two line tests includes performing the at least two line tests at a predetermined interval.

15. The method of claim 10, wherein the performing at least two line tests includes performing a single ended line test for each line test of the at least two line tests.

16. The method of claim 10, wherein the analyzing the two or more differences includes generating a sum by adding the two or more differences corresponding to the location along the drop connection and determining whether the generated sum exceeds a predetermined threshold.

17. A method of locating faults in drop connections of a telecommunication system, the method comprising:
- selecting a drop connection, wherein the selected drop connection has a corresponding transceiver that uses discrete multi-tone (DMT) modulation for communication via the drop connection, wherein the selecting the drop connection includes determining whether a predetermined number of retrains associated with the corresponding transceiver occurred within a predetermined time period;
- performing at least two line tests on the selected drop connection;
- receiving corresponding results from each line test of the at least two line tests;
- comparing the received results of the at least two line tests to compute one or more differences;
- analyzing the computed one or more differences to determine at least one fluctuation on the selected drop connection; and
- locating at least one fault for the selected drop connection based on the determined at least one fluctuation.

18. A method of locating faults in drop connections of a telecommunication system, the method comprising:
- selecting a drop connection, wherein the selected drop connection has a corresponding transceiver that uses discrete multi-tone (DMT) modulation for communication via the drop connection;
- performing at least two line tests on the selected drop connection;
- receiving corresponding results from each line test of the at least two line tests;
- comparing the received results of the at least two line tests to compute one or more differences;
- analyzing the computed one or more differences to determine at least one fluctuation on the selected drop connection, wherein the analyzing the computed one or more differences includes determining whether a sum of the computed one or more differences at a particular time exceed a predetermined threshold; and
- locating at least one fault for the selected drop connection based on the determined at least one fluctuation.

19. A service unit, comprising:
- communication circuitry coupled to a network facility to receive a data stream from the network facility; and
- a plurality of transceivers configured to transmit data from the data stream across a plurality of drop connections to customer premises equipment (CPE) at one or more customer premises, and wherein each of the plurality of transceivers uses discrete multi-tone (DMT) modulation to communicate via the plurality of drop connections; and
- a processor configured to select a drop connection of the plurality of drop connections for evaluation, perform a plurality of line tests on the selected drop connection, compute a plurality of difference values from a plurality of results from the plurality of line tests, each of the plurality of difference values corresponding to a location along the drop connection and indicating a difference in amplitudes of signals reflected from the location, and determine whether a fault is present on the selected drop connection based on the plurality of difference values.

20. The service unit of claim 19, wherein the processor is configured to receive the plurality of results from the plurality of line tests and compare the plurality of results of the plurality of line tests to compute the plurality of difference values.

21. The service unit of claim 20, wherein the processor is configured to perform an inverse fast Fourier transform on the plurality of results from the plurality of line tests.

22. The service unit of claim 19, wherein the processor is configured to analyze the plurality of difference values to determine a fluctuation on the selected drop connection at the location of the fluctuation on the selected drop connection and detect the fault at the location based on the fluctuation.

23. The service unit of claim 19, wherein the processor is located in one of the network facility or the service unit of the at least one distribution point.

24. The service unit of claim 19, wherein the processor is located in a network management device coupled to the network facility by a network.

25. The service unit of claim 19, wherein the processor is configured to determine a total value by adding the plurality of difference values corresponding to the location along the drop connection and compare the total value to a threshold value to determine the presence of a fault at the location.

26. A service unit, comprising:
- a transceiver coupled to a telecommunication line and configured to transmit discrete multi-tone (DMT) signals across the telecommunication line; and
- at least one processor configured to perform a plurality of single-ended line tests (SELTs) on the telecommunication line, wherein for each of the SELTs, the at least one processor is configured to cause the transceiver to transmit a DMT signal across the transmission line and to measure a plurality of returns of the DMT signals transmitted for the plurality of SELTs, the at least one processor further configured to compare the plurality of returns to compute a plurality of difference values, each of the plurality of difference values corresponding to a location along the telecommunication line and indicating a difference in amplitudes of signals reflected from the location, analyze the plurality of difference values to identify a fluctuation at the location and to detect an anomaly at the location along the telecommunication line based on the identified fluctuation.

27. The service unit of claim 26, wherein the at least one processor is configured to perform an inverse fast Fourier transform on measurements of the plurality of returns to convert the measurements from the frequency domain to the time domain and to detect the anomaly based on the transformed measurements.

28. The service unit of claim 26, wherein the at least one processor is configured to determine a total value by adding the plurality of returns corresponding to the location along the telecommunication line and compare the total value to a threshold value to detect an anomaly at the location.

29. A service unit, comprising:
- a transceiver coupled to a telecommunication line and configured to transmit discrete multi-tone (DMT) signals across the telecommunication line; and
- at least one processor configured to perform a plurality of single-ended line tests (SELTs) on the telecommunication line, wherein for each of the SELTs, the at least one processor is configured to cause the transceiver to transmit a DMT signal across the transmission line and to measure returns of the DMT signal transmitted for the respective SELT, the at least one processor is further configured to identify a fluctuation in the returns of DMT signals transmitted for a plurality of the SELTs and to detect an anomaly along the telecommunication line based on the identified fluctuation at a point corresponding to the identified fluctuation, and wherein the at least one processor is configured to sum differences in measurements of the returns of the DMT signals for the corresponding point.

* * * * *